United States Patent [19]

Ohshima et al.

[11] Patent Number: 4,727,799

[45] Date of Patent: Mar. 1, 1988

[54] COOKING APPLIANCE WITH SENSOR MEANS

[75] Inventors: Itiro Ohshima, Nara; Akinori Kitajima, Yao, both of Japan

[73] Assignee: Sharp Kabushiki Kaisha, Osaka, Japan

[21] Appl. No.: 880,749

[22] Filed: Jul. 1, 1986

[30] Foreign Application Priority Data

Jul. 1, 1985 [JP] Japan .......................... 60-100884[U]
Jul. 1, 1985 [JP] Japan .......................... 60-100885[U]

[51] Int. Cl.[4] .............................................. A47J 27/62
[52] U.S. Cl. ................................. 99/331; 219/10.55 E
[58] Field of Search ................. 99/280, 281, 282, 283, 99/326, 328, 329, 331, 333; 219/10.55 E, 490, 494, 510; 126/273 R, 273.5, 275 R, 275 E, 19 R, 19 M

[56] References Cited

U.S. PATENT DOCUMENTS

| 4,254,325 | 3/1981 | Snyder | 99/329 R |
| 4,341,937 | 7/1982 | Staats | 219/10.55 R |
| 4,367,388 | 1/1983 | Ishihara et al. | 99/325 |

FOREIGN PATENT DOCUMENTS

1095935 12/1967 United Kingdom .

OTHER PUBLICATIONS

British Search Report for British Application No. 8616005, Nov. 14, 1986, 3 pages.

*Primary Examiner*—Henry S. Jaudon
*Attorney, Agent, or Firm*—Birch, Stewart, Kolasch & Birch

[57] ABSTRACT

A cooking appliance comprising a sensor for detecting the surface temperature of food being cooked, and the sensor being located in a position below the food cooking table.

6 Claims, 9 Drawing Figures

COOKING APPLIANCE WITH SENSOR MEANS

BACKGROUND OF THE INVENTION

The present invention relates to a cooking appliance that automatically controls the operation of the cooking appliance by detecting the surface temperature of food by a sensor such as a thermistor.

The following example refers to an oven toaster. In order to correctly identify the condition of food being cooked, an oven toaster using a quartz-tube electric heating device needs to constantly monitor the condition of the food being cooked by a sensor. It is required that a system that controls the operation of the cooking appliance by detecting the temperature of cooking food detect even the slightest thermal energy radiated from the surface of food cooking. To achieve this, the requirements listed below have to be taken into account when installing the sensor. (1) The sensor should be located in a position as close to the food as possible; (2) The distance between the food and sensor should be constant; and (3) The sensor should not encounter extremely high temperatures, i.e., the sensor should remain perfectly free from this influence of heat sources such as the heating device.

Conventionally, a cooking appliance is provided with a sensor 11 in a position above the food to be cooked, as shown in FIG. 1. Since the thermal energy generated by a heater 3 for cooking food 4 rises upward, the sensor 11 in unavoidably exposed to high temperatures and thus influenced by the heated generated by the heater 3 that remains inside the chamber 14 of a cooking appliance 10. To keep the distance 17 between the sensor 11 and food 4 constant, it is necessary to vary the position of sensor 11 in accordance with the thickness of the food 12.

FIG. 2 describes the relationship between the voltage output from the sensor and the ambient temperature. The vertical axis indicates that detection signal of voltages output from the sensor, whereas the horizontal axis denotes temperatures surrounding the sensor. Despite the constant temperature of the heat source and the constant distance between the food and the heat source, the voltage output from the sensor decreases significantly as the temperature surrounding the sensor rises. Consequently, when a cooking appliance such as that shown in FIG. 1 is used, as the temperature in the cooking chamber of said appliance 10 rises by the heater 3, the surrounding temperature of the sensor 11 and the temperature of sensor 11 itself also rises. Therefore, the output from the sensor 11 when the sensor 11 detects the thermal energy generated from cooking food 4 decreases to an extremely low level, as shown in FIG. 1. Consequently, to amplify the detecting signal to the desired level, a number of amplifying circuits are needed. However, when the output signal of the sensor is amplified, a variety of errors present in the detection signal are also amplified. Conventional cooking appliances cannot therefore generate the correct output signal needed to accurately detect the thermal energy radiating from food being cooked.

SUMMARY OF THE INVENTION

The present invention aims at providing a cooking appliance, with a sensor for detecting the condition of food being cooked installed at a position below the food-cooking surface.

Another object of the present invention is to provide a cooking appliance including a sensor installed outside the chamber of the cooking appliance.

A still further object of the present invention is to provide a cooking appliance including a sensor installed at a position below the food-cooking surface, where the surrounding temperature of the sensor remains relatively low.

Yet another object of the present invention is to provide a cooking appliance including a sensor installed below either one of both sides of the food-cooking table.

Other objects and the further scope of applicability of the present invention will become apparent from the detailed description given hereinafter. It should be understood, however, that the detailed description and specific examples, while indicating preferred embodiments of the invention, are given by way of illustration only, since the potential for various changes and modifications within the spirit and scope of the invention will become apparent to those skilled in the art from the following detailed description.

To achieve the above objects, according to one of the preferred embodiments of the present invention, a cooking appliance comprises sensor means for detecting the surface temperature of cooking food, wherein said sensor is provided in a position below the food-cooking table. The sensor may also be installed at a position behind the food-cooking table when looking from the front door.

The sensor may also be installed in the external air path between the reflection plate making up the chamber of the cooking appliance and the external housing unit. If the cooking appliance can simultaneously cook several pieces of the same type of food, said sensor may be installed in a position below the food-cooking surface, or inside the chamber to either the left or right of the cooking appliance.

An indicator mark denoting the position of said sensor may also be provided.

BRIEF DESCRIPTION OF THE DRAWINGS

The present invention will be better understood from the detailed description given hereinbelow and the accompanying drawings which are given by way of illustration only, and thus are not limitative of the present invention wherein.

DESCRIPTION OF THE PREFERRED EMBODIMENTS

Referring now to the accompanying drawings, the preferred embodiments of the present invention are described below.

Figure 3:
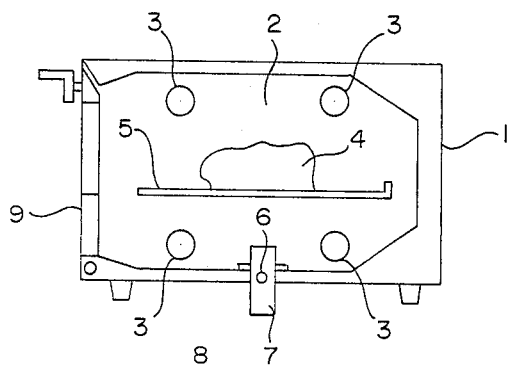
FIG. 3 is a lateral sectional view of a cooking appliance according to the first preferred embodiment of the present invention.

FIG. 3 shows a lateral sectional view of a cooking appliance according to the first preferred embodiment of the present invention. Although an oven toaster is described below, the present invention may not be the oven toaster. In FIG. 3, the reference numeral 1 denotes a cooking appliance itself. The reference numeral 2 denotes a cooking chamber. The reference numeral 3 denotes heat-generating sources of four heating units, i.e., two units each above and below a food table 5. A sensor 6 such as a thermistor is provided with a sensor cover 7 on its periphery. The sensor 6 detects a temperature in a space 8. The cooking appliance 1 is provided with a door 9.

Figure 1:
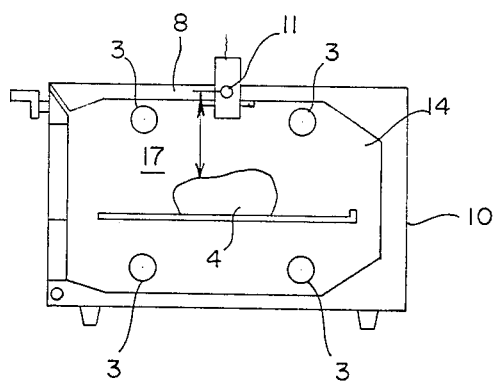
FIG. 1 is a lateral sectional view of a conventional cooking appliance.
Figure 5:
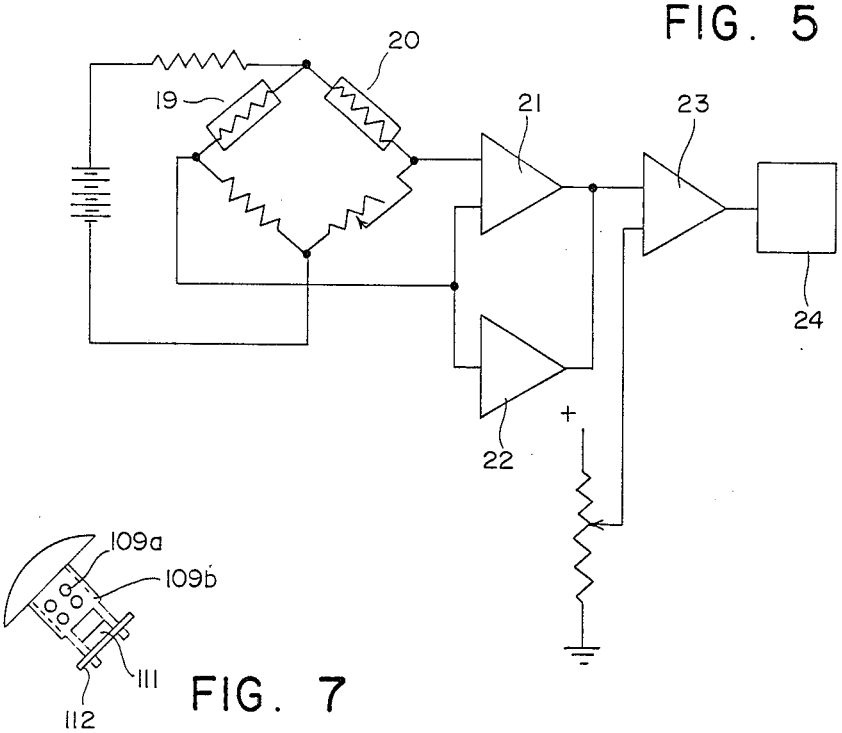
FIG. 5 is a block diagram of the basic circuit of the controller using the sensor.

FIG. 5 is a simplified block diagram denoting the basic controller circuit using a sensor. In FIG. 5, the reference numeral 19 denotes a sensor such as a thermistor. The reference numeral 20 denotes a compensatory thermistor. The thermistors 19 and 20 make up a bridge circuit from which the output signals control power supply to the cooking appliance via an amplifier circuit 21, a compensation circuit 22, a comparison-control circuit 23, and a relay 24. In a cooking appliance as shown in FIG. 1, since thermal energy is inversely proportional to the square of the distance, the distance 17 between a sensor 11 and the food 4 should be held constant. However, depending on the thickness of the food, the distance required varies and it is thus difficult in practice for any conventional cooking appliance to maintain a constant distance.

Figure 2:
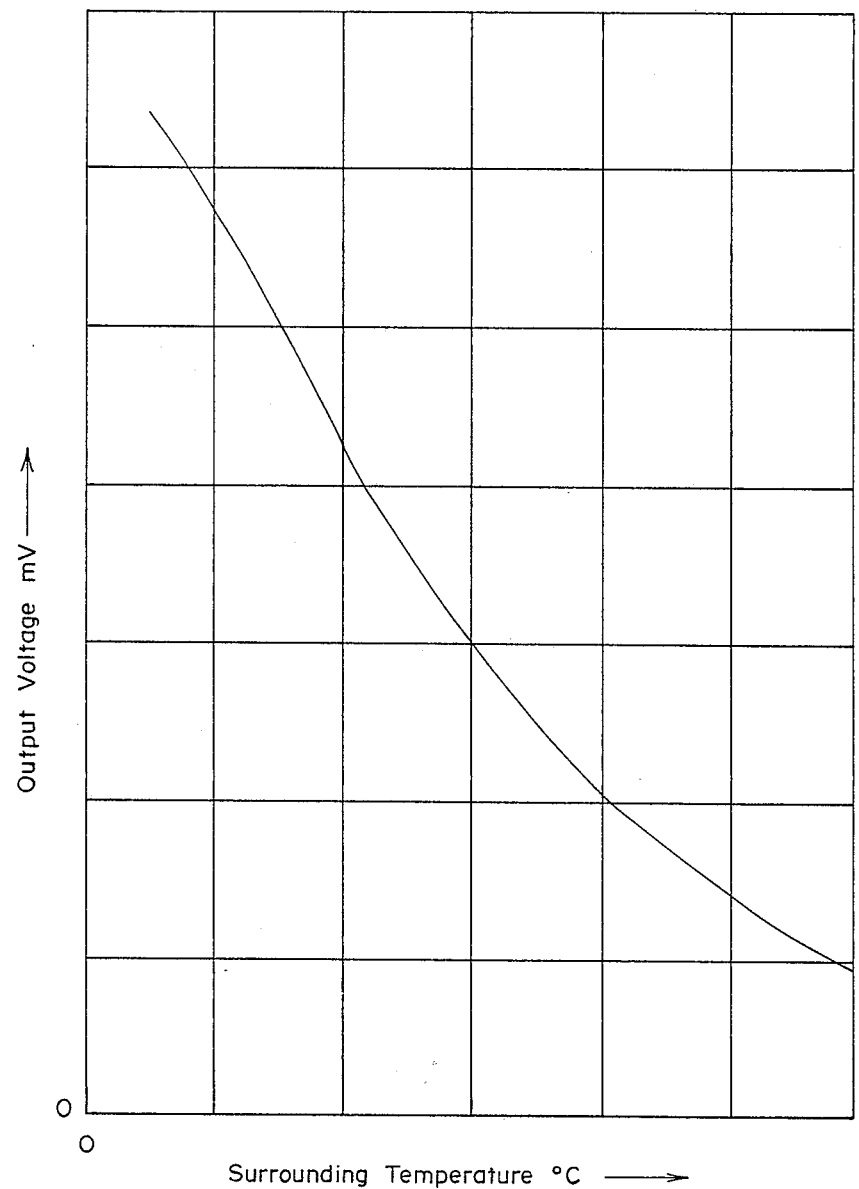
FIG. 2 is the relationship between the voltage output from the sensor and the ambient temperature.

To resolve this problem, the present invention provides a sensor 6 located below the food 4. Compared to the conventional arrangement which locates the sensor 6 above the food, the heat radiated from the heater 3 rises and a difference of about 50° C. in the temperature surrounding the sensor in the cooking chamber may result between the lower portion and the upper portion of the chamber. If the surrounding temperature of the sensor is lower, the level of the detection signal for detecting the thermal energy is higher, as shown in FIG. 2.

Accordingly, the placement of the sensor in the cooking appliance results in enhanced sensitivity in detecting the thermal energy radiated from food being cooked compared to any conventional cooking appliance. The sensor is herefore able to detect the completion of food cooking more accurately. In addition, due to higher detection signal, there is no need to amplify the signal from the sensor in steps. Therefore, errors present in detection signal are not amplified, further enhancing the accuracy of detecting thermal energy from food cooking in the chamber.

Figure 4:
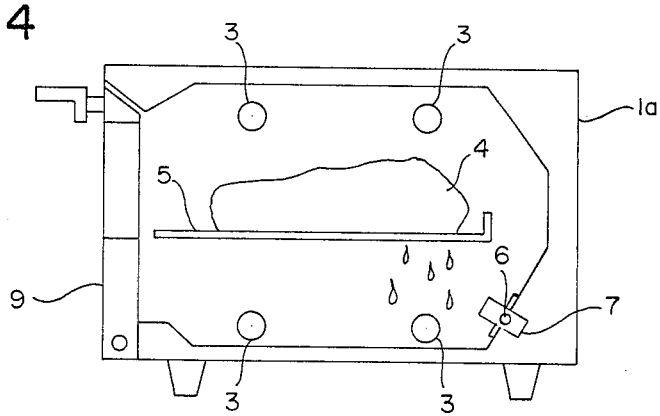
FIG. 4 is a lateral sectional view of a cooking appliance according to the second preferred embodiment of the present invention.

FIG. 4 is a lateral sectional diagram according to the second preferred embodiment a cooking appliance 1a of the present invention. In the second preferred embodiment, the sensor 6 is not located right below the food 4 being cooked, but at the back, in a position, further away from the door. This effectively prevents heated pieces of food and its juices from entering the sensor 6 during cooking, so the sensor 6 will not become faulty. Thus, the sensor is able to correctly detect the surface temperature of food while cooking is under way.

In the second preferred embodiment, since the sensor 6 is located below the food-cooking surface, the distance between the sensor 6 and the food remains constant, regardless of the thickness of the food. In addition, compared to any conventional device provided with a sensor above the food-cooking surface, the surrounding temperature of the sensor 6 remains low in the cooking chamber. The sensor 6 can therefore correctly detect the surface temperature of food while cooking is under way. In the present invention, the sensor 6 is located to the rear, away from the cooking position of the food. Since neither food nor juices can easily enter into and damage the sensor 6, the sensor 6 will be not become faulty. The cooking appliance reflecting a third preferred embodiment is described below.

Figure 7:
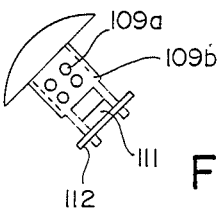
FIG. 7 is a view of the structure of the installation of the sensor in the cooking appliance shown in FIG. 6.
Figure 6:
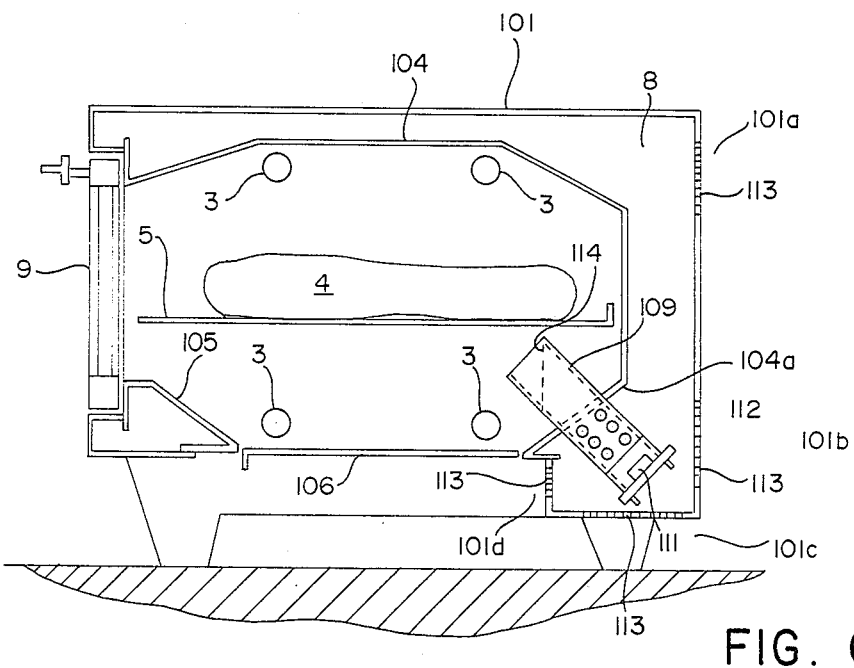
FIG. 6 is a lateral sectional view of a cooking appliance according to the third preferred embodiment of the present invention.

In FIG. 6 the reference numeral 101 denotes an external housing of the cooking appliance closing and opening the cooking chamber. The reference numeral 9 denotes a front door of the appliance closing and opening the cooking chamber. Reference numerals 104 and 105 denote reflection plates that form the food-cooking chamber. A bottom plate 106 makes up part of the food-cooking chamber and receives excess food pieces. Food is disposed on a food-cooking table 5. The table 5 may be formed as a lattice-like net table. The reference numerals 3 denote four heat-generating units, e.g., quartz-tube heaters, two of which are installed above and below the food-table 5. A square cylindrical sensor cover 109 is provided below the food-table 5 and on the rear reflection plate 104a which faces the door 9, while the sensor cover 109 penetrates the reflection plate 104a and projects into a space 8 formed between the external housing 101 and the reflection plate 104a. The reference numeral 111 denotes a sensor such as a thermistor provided on a substrate 112 made of bakelite which extends from the sensor cover 109 into the space 8. The arrangement of the sensor 111 is shown in detail in FIG. 7. To ensure satisfactory ventilation around the sensor 111, the sensor cover unit 109 is open except for the lower portion 109b, while a number of ventilation holes 109a are present in the sensor cover 109 between the reflection plate 104 and the foot 109b in the space 8.

Ventilation 113 including a number of small holes is provided in four positions 101a, 101b, 101c, and 101d in the external housing of the cooking appliance, thus ensuring satisfactory ventilation throughout the space 8. Due to convection currents present in the cooking chamber, there is considerable temperaure difference between the uper and lower parts of the cooking chamber. The temperature is significantly lower in the lower part. Referring to the present invention, since the sensor 111 is positioned in the space 8 outside the reflection plate 104a, the sensor 111 is not exposed to the high temperatures generated by the heaters 3 or the heated atmosphere inside the chamber. In addition, since air in the space 8 flows upward and the air outside flows into the housing through the ventilation holes 113, the sensor 111 is constantly cooled and remains at a low temperature. If the sensor 111 is installed at a position above the food cooking table 107, hot air tends to come in from cooking chamber through the sensor-cover installation holes on the reflection plate 104a, the sensor 111 cannot be cooled sufficiently. Since the sensor cover 109 directs thermal energy from food being cooked to the sensor 111 using reflection from its lateral surface, the thermal energy from food being cooked can be collected effectively. However, the sensor cover 109 is heated by hot air inside the cooking chamber, and heat is easily conducted to the sensor-cover installation part thus affects the sensor 111. To prevent this, a number of ventilation holes are provided to facilitate that radiation, and in addition, since the sensor 111 itself is installed on the bakelite substrate 112 featuring low thermal conductivity, the temperature surrounding the sensor 111 is effectively kept low. Since the sensor 111 is located in the space 8 outside the cooking chamber, the sensor 111 cannot be harmed by food or cooking juices, and thus it will not become faulty.

In addition, by cutting out the tip portion from the sensor cover 109 as shown by the broken line 114 in FIG. 6, the sensor 111 cannot be exposed to food pieces falling from the food-cooking table, thus making it possible for the sensor 111 to detect the surface temperature of the food 4 even more precisely.

The third preferred embodiment relates to a cooking appliance provided with a food-cooking table inside the cooking chamber and detects the surface temperature of food being cooked using a sensor such as a thermistor. The cooking appliance is provided with a space formed by an external air passage between the external housing and the reflection plate forming the cooking chamber in order to allow the sensor to be positioned in the space, below said food-cooking table. Consequently, by installing the sensor in this space outside the cooking chamber, the sensor is not adversely affected by the heating device nor the hot air present in the cooking chamber. In addition, ventilation holes provided in the external housing of the cooking appliance promote air flow and effectively lower the surrounding temperature of the sensor, thus allowing the sensor to correctly measure the surface temperature of food cooking.

Figure 8:
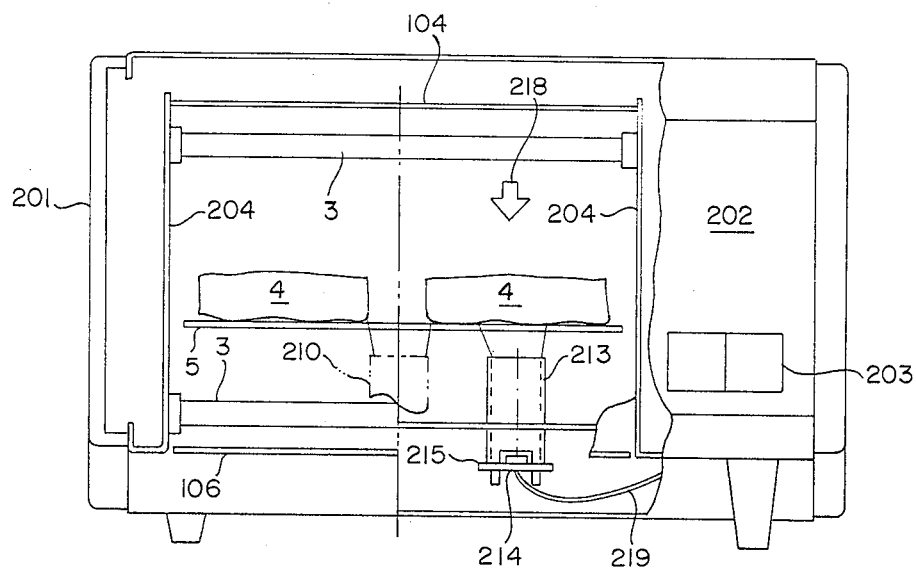
FIG. 8 is a front sectional view of the main part of the cooking appliance according to the forth preferred embodiment of the present invention.

Using the example of an oven toaster, a fourth preferred embodiment of the present invention is described below. The oven toaster of the fourth embodiment can simultaneously heat several kinds of food. FIG. 8 is a front sectional view of an oven toaster reflecting the fourth embodiment of the present invention. In FIG. 8, the reference numeral 201 denotes an oven toaster itself. Independent of the door (not shown), an operation control panel 202 is provided to the right of the front panel. The reference numeral 203 denotes a control switch provided in the control panel 202. The reference numerals 204 and 204 denote lateral reflection plates making up part of the cooking chamber. A ceiling surface reflection plate 104 extends to the back surface of the cooking chamber. The reference numeral 106 denotes a bottom plate of the cooking chamber, which collects food pieces that fall from the cooking table. A food-cooking table 5 may be made of a lattice net. The reference numerals 3 denote heat-generating sources such as quartz-tube heaters located above and below the food-cooking table. In the oven toaster described above, a sensor cover which shuts off the thermal energy from the heaters 3 may be provided in the position designated by the broken line 210 in the center of the lower part of the cooking chamber.

As shown in FIG. 8, the sensor over 210, is located in the center the food-cooking table 5 to detect thermal energy, and thus the sensor itself (not shown) is located in the center of the food-cooking table 5 at the bottom of the sensor cover 210. However, when the sensor is placed in that position, the following disadvantages may affect the function of the sensor. In the cooking appliance described above, as soon as power is transmitted to the heaters 3 by activating the control switch 203, the heaters 3 start to heat the food 4. The heated food 4 radiates thermal energy which then penetrates the sensor cover 210 located below the food-cooking table 5 to allow the sensor to detect it. As soon as the predetermined temperature is reached on the surface of the cooking food, the controller cuts off the power supply to the heaters 3 to stop the cooking. Therefore, the sensor should be in a position from which it can constantly sense the condition of food being cooked. However, when using an oven toaster capable of simultaneously cooking several pieces of food 4 and 4 as shown in FIG. 8, the sensor may not always function correctly, depending on the size of the food and the placement of the food on the food-cooking table.

In the oven toaster shown in FIG. 8, the sensor cover was not accurately directed at the food 4 and 4, and as a result, the sensor did not detect the surface temperature of the cooking food and eventually malfunctioned. Likewise, when cooking two kinds of food, they were placed on both sides of the cooking table 5, the sensor installed below and at the center portion of the cooking table 5 was unable to detect correctly the surface temperature of the cooking food. To solve the above problems, the present invention provides a fifth embodiment, described below.

Figure 9:
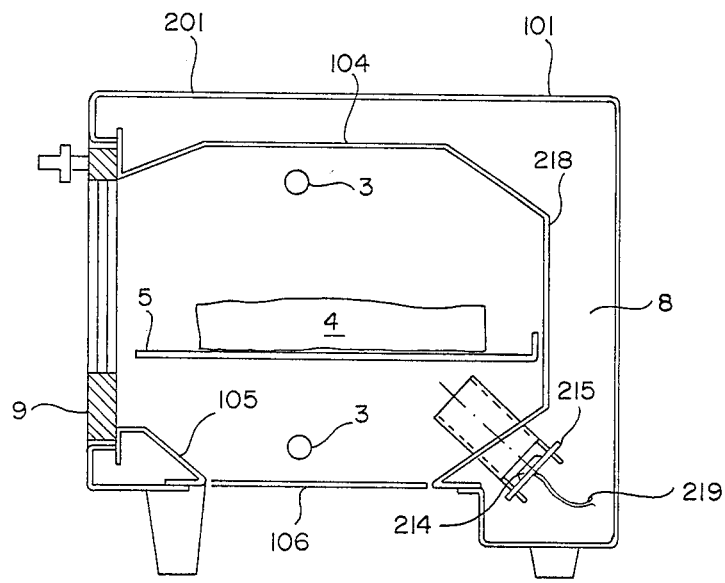
FIG. 9 is a lateral sectional view of the cooking appliance shown in FIG. 8.

FIG. 9 is a lateral sectional view of the cooking appliance shown in FIG. 8. In FIG. 9, the reference numeral 9 denotes the door secured to the cooking appliance 201. The reference numeral 105 denotes the reflection plate set at the bottom part of the front of the cooking chamber. The sensor cover 213 shields the sensor 214 from the thermal energy radiated from the heaters 3. The sensor 214 is secured to a substrate 215 at the bottom of the sensor cover 213. The sensor cover 213 projects through the reflection plate 104, and into the space 8 between the cooking chamber and the external housing 101 so that the sensor 214 itself can be located in the space 110.

In the fifth preferred embodiment, as shown in FIG. 8, the sensor cover 213, the sensor 214 placed at the bottom of the sensor cover 213 and the substrate 215 securing the sensor 214 are located in the central part of the right side of the food-cooking table 5, allowing the sensor 214 to detect the thermal energy present in the central part of the right side. Consequently, when the cooking appliance according to the fifth embodiment of the present invention simultaneously cooks foods 4 and 4 in the chamber, the sensor 214 detects the temperature of either one of the cooking foods 4 and 4. Since the foods 4 and 4 in the oven are heated under identical conditions, by correctly sensing the cooking completion condition of either of these foods, the sensor 214 can simultaneously detect the cooking completion condition of both.

In the present embodiment, the description refers to an oven toaster simultaneously baking two slices of bread. The same description could pertain to the case where 3 or 4 slices of bread are baked. While cooking several pieces of food, the sensor 214 should be installed in a position such that it has access to one of the pieces of food. However, while toasting a slice of bread, for example, since the sensor 214 is not located in a central position, a position mark 218 indicating the exact food position should be provided. By visually setting a position mark by an arrow, for example, the user can easily identify the suggested position when placing food on the cooking-table when opening the door.

The reference numeral 219 denotes a wire connected to the sensor 214. If the sensor 214 is installed below the right of the cooking table, i.e., the position close to the control panel 202, it is easy to arrange the wire between the control panel 202 and the sensor 214. It is also possible to install the sensor 214 to the left to allow it to detect the thermal energy present in the center of the left side of the cooking chamber.

The fifth embodiment provides for a cooking appliance that can simultaneously cook a few pieces of food and detect the surface temperature of cooking food by means of a sensor such as a thermistor. The senosr is located on either the left or the right side inside the cooking chamber. In addition, as a mark indicating the position of the sensor is provided inside the chamber, when several pieces of food are being cooked, the sensor can correctly detect one of these, thereby allowing the sensor to detect the cooking completion condition of all the cooking food. For the cooking of a single piece of food, the mark instructs the user to locate the sensor in a central position. The user can operate a cooking appliance embodied in the present invention without worrying about where to place the food on the cooking table.

Application of the present invention is not limited to oven toasters, but is also applicable to other appliances.

While certain embodiments of the present invention have been described, it will be apparent to those skilled in the art that various changes and modifications may be made therein without departing from the spirit and scope of the present invention as claimed.

What is claimed is:

1. A cooking appliance comprising:
   an internal, cooking chamber for housing food being cooked;
   an external housing unit enclosing said internal, cooking chamber and defining a space therebetween;
   sensor means for detecting surface temperature of the food being cooked; and
   means for mounting said sensor means in said space at a position located beneath the food being cooked in said internal, cooking chamber, said position of said sensor means avoiding interference with said detecting by said sensor means due to heat rising from said food being cooked.

2. The cooking appliance of claim 1, wherein said internal cooking chamber has a food cooking position as well as a door for sealing said chamber, said door being located at a front portion of said chamber, said means for mounting said sensor being located at a position behind the food cooking position relative to the door.

3. The cooking appliance of claim 1, wherein said external housing unit has a plurality of vents therein, said vents being spaced such that air will flow through said space in response to differences in temperature in said space, said differences in temperature resulting from cooking of said food, said sensor means being cooled by said flow of air.

4. The cooking appliance of claim 1, further comprising a table for holding said food, said table being displaced from a bottom of said internal, cooking chamber capable of holding several pieces of food which are cooked simultaneously.

5. The cooking appliance of claim 4, wherein said internal, cooking chamber has a right and left portion and wherein said means for mounting said sensor means is located in said space at a position proximate to one of the left and the right portions of the cooking chamber.

6. The cooking appliance of claim 5, wherein an identifying mark is provided in the portion of the internal, chamber which is proximate to said means for mounting, said identifying mark advising a user of the position of said sensor.

* * * * *